United States Patent [19]

Thomas

[11] 4,332,982
[45] Jun. 1, 1982

[54] TELEPHONE TOLL CALL SECURITY AND LOGGING DEVICE AND METHOD

[75] Inventor: Ralph H. Thomas, Bath, Ohio

[73] Assignee: Ident-A-Call, Inc., Akron, Ohio

[21] Appl. No.: 184,242

[22] Filed: Sep. 5, 1980

[51] Int. Cl.³ .............................................. H04M 1/66
[52] U.S. Cl. ........................... 179/7.1 R; 179/7.1 TP; 179/18 B; 179/18 DA
[58] Field of Search ............... 179/7 R, 7 MM, 7.1 R, 179/7.1 TP, 18 B, 18 DA, 18 AD

[56] References Cited

U.S. PATENT DOCUMENTS

| | | | |
|---|---|---|---|
| 3,546,381 | 12/1970 | Foley et al. | 179/7.1 R |
| 3,770,893 | 11/1973 | Conerly | 179/7 MM |
| 3,806,652 | 4/1974 | Woolf et al. | 179/7.1 R |
| 3,873,781 | 3/1975 | Nissim | 179/18 B |
| 3,934,095 | 1/1976 | Matthews et al. | 179/18 B |
| 4,045,619 | 8/1977 | Harrington | 179/7.1 R |
| 4,099,033 | 7/1978 | Murray | 179/18 DA |

FOREIGN PATENT DOCUMENTS 2741170  10/1978  Fed. Rep. of Germany ....... 179/7.1 TP

OTHER PUBLICATIONS

Benner, *Trimming the Fat From Phone Costs*, INC., pp. 66–69, (May 1979).
Mandell, *Cutting Phone Charges with Computers*, Computer Decisions, pp. 28–30 and 73–76, (Mar. 1979).
Letter from Peter French, Vice-President of Natel Systems, Inc., including accompanying literature.

*Primary Examiner*—Gerald L. Brigance
*Attorney, Agent, or Firm*—Hamilton, Renner & Kenner

[57] ABSTRACT

A device and embodied method to control access to and log telephone calls made upon a long-distance telephone network includes a telephone instrument (11), a telephone line interface (12) for selectively connecting the telephone instrument (11) to an incoming telephone line ($T_1$, $R_1$) and a local telephone power supply system (23), which telephone line interface (12) provides output signals indicative of the operational status of the telephone instrument (11) and all numbers dialed on the telephone instrument (11), an access code memory (50) for storing and providing output signals indicative of a plurality of security codes authorized for utilization of the long-distance telephone network, a first (51) and second (52) log memory for storing data regarding all outgoing long-distance telephone calls made from the telephone instrument (11), and a control unit (15) which receives the output signals from the telephone line interface (12), and the access code memory (50). The control unit (15) monitors the telephone line interface (12) and upon detection of a dialed number initiating a tie-in to the long-distance telephone network directs connection of the telephone instrument (11) to the local telephone power supply system (23) and connection of the incoming telephone line ($T_1$, $R_1$) to a holding load (21). The control unit (15) compares the next dialed number received to those stored in the access code memory (50) to determine the validity thereof and upon determination of a valid access code directs reconnection of the telephone instrument (11) with the incoming telephone line ($T_1$, $R_1$) and further directs one of the log memories (51, 52) to record the dialed access code and telephone number.

12 Claims, 3 Drawing Figures

TELEPHONE TOLL CALL SECURITY AND LOGGING DEVICE AND METHOD

TECHNICAL FIELD

The present invention relates generally to telephone management systems. More particularly, the present invention contemplates a device for controlling access to the long-distance telephone network and logging selected data pertaining to allowed calls. Still more specifically, the present invention pertains to a telephone management device and method that inhibits unauthorized users from making toll calls and tracks and produces digital data recordings of allowed long-distance calls.

BACKGROUND ART

Long-distance telephonic communications have become a necessity to the efficient operation if not the survival of innumerable corporate and governmental entities. Contemporaneously with the growth of this need has come a voluminous expansion in the abuse of such services by unauthorized individuals gaining access to a telephone instrument. Additionally, because of the great number of relatively low-cost individual toll calls now being made, it has become increasingly more difficult to economically recapture authorized total long-distance telephone operating costs, which even for many small and moderately sized entities frequently amount to thousands of dollars each month.

Electronic devices recently devised to provide such cost accounting generally have been placed in one of two categories: "active" or "passive". Active telephone management systems are those that automatically select the most inexpensive toll call routing from several available alternatives (e.g., wide area telephone service (WATS), leased line, foreign exchange, satellite channel, private carrier or regular network). Passive telephone management systems simply keep track of outgoing long-distance calls and periodically generate hard-copy reports of the same.

Heretofore only active telephone management systems, costing several tens of thousands of dollars, have been capable of limiting user access to the toll-call network. Because these systems select the least costly toll call routing at the time of each call, they do not also provide logging features. On the other hand, if one is desirous of charging the actual user or called party for toll call expenses, the hard-copy logging reports furnished by passive telephone management systems require enormous manual labor investments to first correlate each call with its actual cost as provided upon telephone company statements. Existing passive telephone management systems also require large blocks of costly integrated circuit memory that are subject to loss of data in the event of power interruptions.

DISCLOSURE OF INVENTION

It is, therefore, an object of the invention to provide an economical device and method for controlling access to a long-distance telephone network.

It is another object of the invention to provide an economical device and method for logging data of interest regarding all outgoing long-distance telephone calls and providing for the automatic correlation of such data with the actual cost as provided upon telephone company statements.

It is still another object of the invention to provide a device, as above, which includes a memory for storing a plurality of readily changable security codes authorized for utilization of the long-distance telephone network.

It is yet another object of the invention to provide a device, as above, including a plurality of memories of limited capacity for logging data regarding all outgoing toll calls in such manner that no calls are missed when a first memory is filled to its capacity and in such manner that power interruptions do not result in loss-of-data.

It is a further object of the invention to provide a device, as above, wherein a first log memory continuously stores data for calls-in-progress until its capacity has been reached whereupon a second memory begins to store call data for calls-in-progress while the first memory transfers its data to an economical large-capacity data storage device.

It is still a further object of the invention to provide a device, as above, wherein the data stored in the large-capacity data storage device is capable of direct digital correlation to digital representations of toll call cost data.

These and other objects and advantages of the present invention over existing prior art forms will become more apparent and fully understood from the following description in conjunction with the accompanying drawings.

In general, a device to control access to and log telephone calls made upon a long-distance telephone network according to the present invention includes a telephone instrument, a telephone line interface for selectively connecting the telephone instrument to an incoming telephone line and a local telephone power supply system (which telephone line interface provides output signals indicative of the operational status of the telephone instrument and all numbers dialed on the telephone instrument), an access code memory for storing and providing output signals indicative of a plurality of security codes authorized for utilization of the long-distance telephone network, a first and second log memory for storing data regarding all outgoing long-distance telephone calls made from the telephone instrument, and a control unit which receives the output signals from the telephone line interface, and the access code memory. The control unit monitors the telephone line interface and upon detection of a dialed number initiating a tie-in to the long-distance telephone network directs connection of the telephone instrument to the local telephone power supply system and connection of the incoming telephone line to a holding load. The control unit compares the next dialed number received to those stored in the access code memory to determine the validity thereof and upon determination of a valid access code directs reconnection of the telephone instrument with the incoming telephone line and further directs one of the log memories to record the dialed access code and telephone number.

A method according to the present invention to control access to and log telephone calls made upon a long-distance telephone network includes the steps of monitoring the operational status of and all numbers dialed on a telephone instrument, detecting a dialed number initiating a tie-in to the long-distance telephone network, connecting the telephone instrument to a local telephone power supply system and the incoming telephone line to a holding load, comparing the next dialed number received to preselected access code numbers to determine the validity thereof, and upon determination of a valid access code reconnecting the telephone instrument with the incoming telephone line and recording the dialed access code and telephone number.

PREFERRED EMBODIMENT FOR CARRYING OUT THE INVENTION

Figure 1:
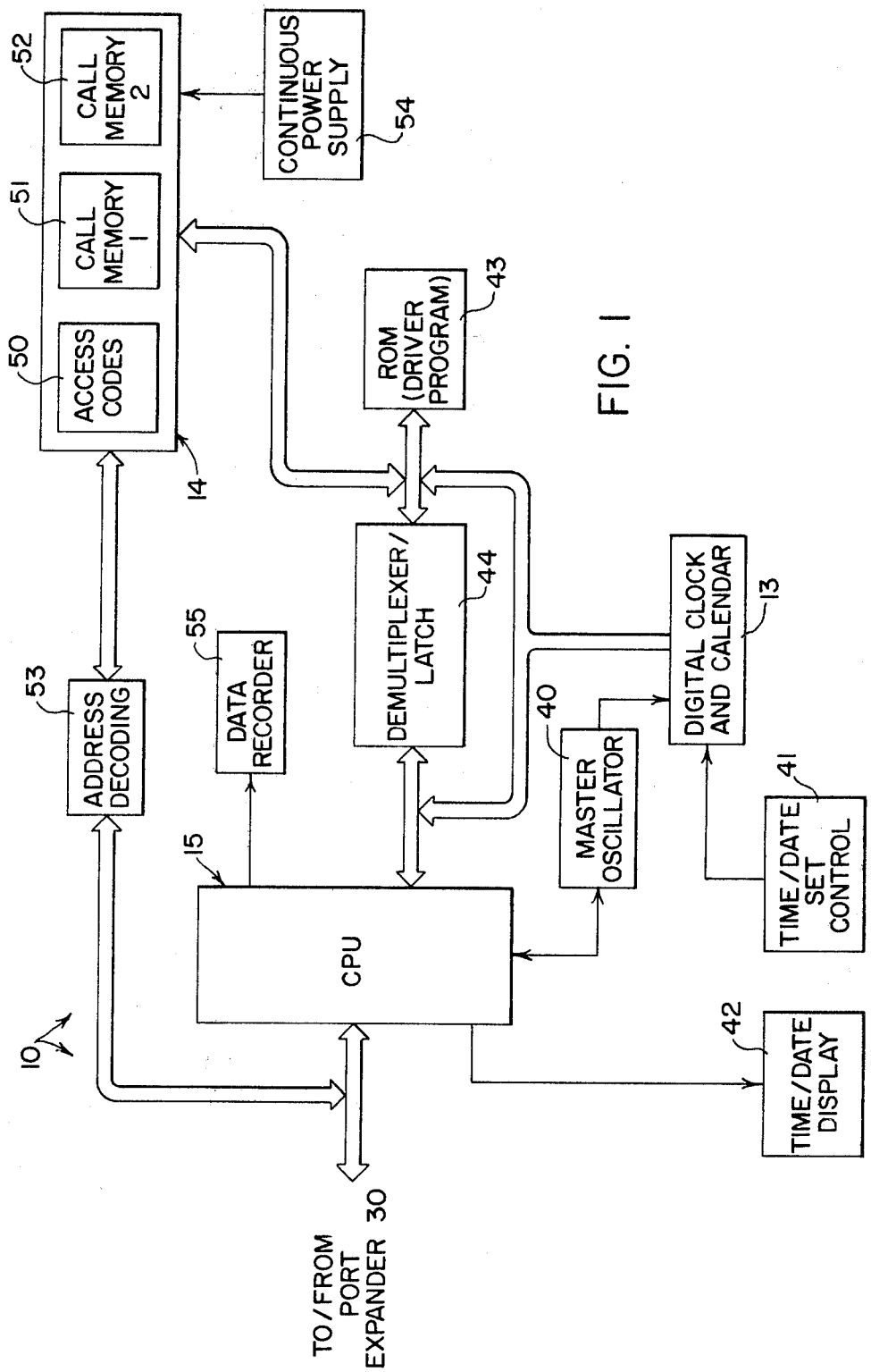
FIG. 1 is a block diagram of a portion of an exemplary device in accordance with the concept of the present invention depicting in particular a control central processing unit (abbreviated as "CPU"), memory, and clock and calendar circuits.
Figure 2:
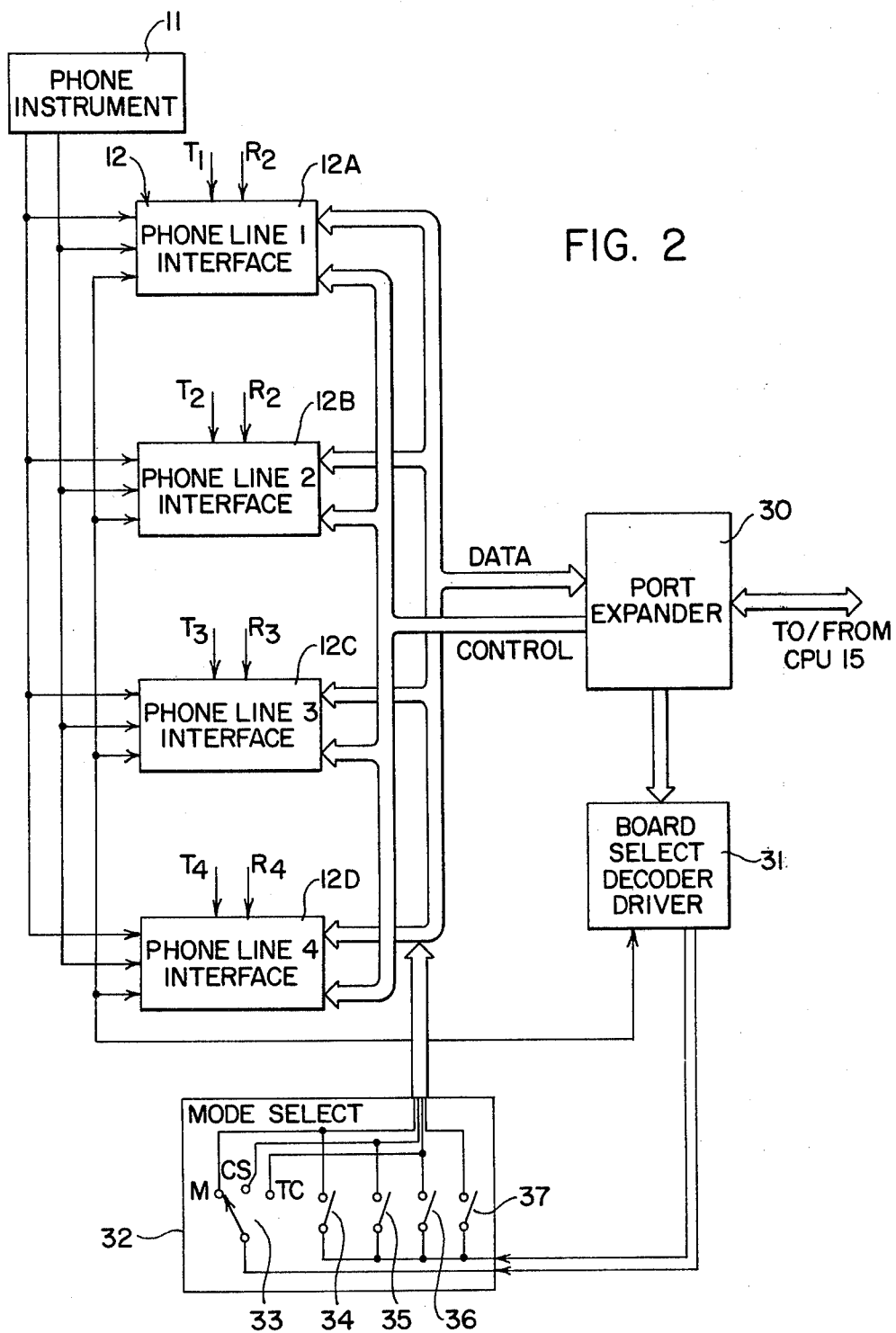
FIG. 2 is a block diagram of the remaining portion not shown in FIG. 1 of an exemplary device in accordance with the concept of the present invention illustrating in particular the phone instrument, a plurality of phone line interface circuits connected to a like plurality of trunk lines, and switches and circuitry suitable for communication with the control CPU depicted in FIG. 1.

FIGS. 1 and 2 together illustrate a device generally indicated by the numeral 10, which also embodies a method to control access to and log telephone calls made upon a long-distance telephone network (hereinafter also referred to as a toll network). Broadly speaking, device 10 includes a conventional telephone instrument 11, a telephone line interface circuit 12, a combined clock and calendar 13, several specialized memories grouped together as memory 14, and a control CPU 15.

Telephone line interface circuit 12 includes a plurality of individual telephone line interfaces 12A–D in like number as that of the incoming telephone lines. For purposes of illustration, four incoming telephone lines are illustrated in FIG. 2 each having separate tip and ring conductors identified by their subscript numerals.

Figure 3:
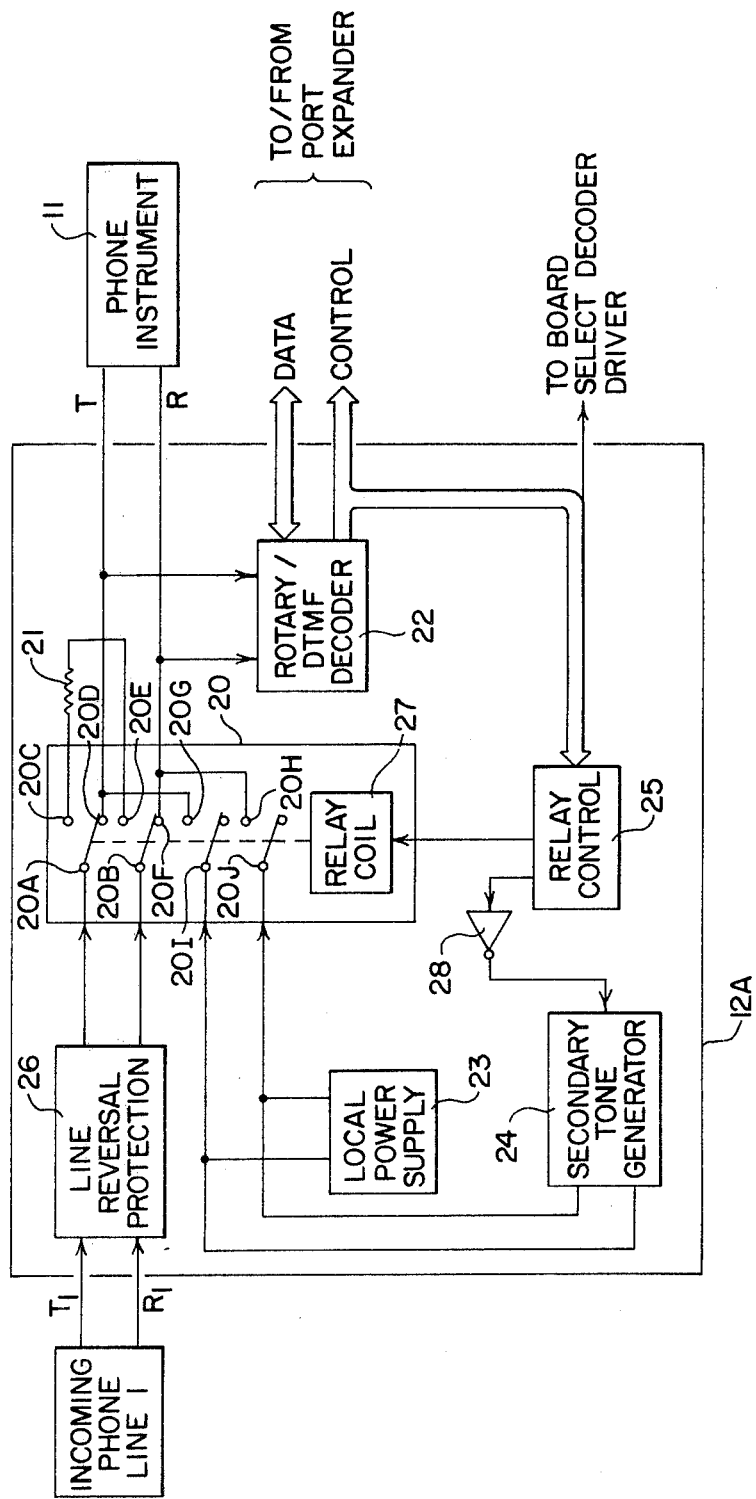
FIG. 3 is a more detailed block diagram of an exemplary phone line interface circuit.

A more detailed block diagram of telephone line interface 12A is shown in FIG. 3 from which telephone line interface 12A can be seen to include a four-pole, double-throw relay 20, a holding load 21, a combined rotary and dual-tone multi-frequency (hereinafter called "DTMF") decoder 22, a local power supply 23, a secondary tone generator 24, a relay control 25 and a line reversal protection circuit 26.

Incoming telephone line one may, where protection is desired against inadvertent line polarity reversals, be connected to line reversal protection circuit 26, which may be a full-wave bridge circuit. The two output conductors from line reversal protection circuit 26 are received by two of the four common terminal inputs 20A and B to relay 20. One pair of the output terminals (20C and D) to input terminals 20A and B has connected thereacross holding load 21 which simply may be a single resistor of suitable value to hold an established incoming phone line one while phone instrument 11 is disconnected therefrom. The other pair of output terminals (20E and F) to input terminals 20A and B are connected to the phone instrument 11, rotary/DTMF decoder 22, and one pair of output terminals 20G and H, the latter of which are in operative association with the remaining pair of common input terminals 20I and J. A local power supply 23 of suitable voltage for furnishing operating power to phone instrument 11 is connected to common input terminals 20I and J in parallel with secondary tone generator 24, the latter of which may be any timer capable of generating an audio dial tone having a frequency different from the frequency utilized in the local telephone utility's switching network.

Relay control 25 includes a conventional latch circuit (not shown) for receiving control signals from control CPU 15 and a driver (not shown) for furnishing operational power to a relay coil 27 within relay 20. Relay control 25 also furnishes an activation logic signal to secondary tone generator 24 after signal voltage level inversion by inverter 28.

Operation of telephone line interface circuit 12 is initiated by a status information check signal from control CPU 15 as detailed hereinafter. Upon receipt of such a signal, rotary/DTMF decoder 22 transmits to control CPU 15 the current operational status of phone instrument 11, i.e., whether phone instrument 11 is "on-hook" (meaning disconnected from the local telephone utility's switching network) or is "off-hook" (meaning a call is about to be made or is in progress). Additionally, data is transmitted indicative of the specific digit or number then being dialed, if any.

As discussed below, upon detection of data from rotary/DTMF decoder 22 indicating phone instrument 11 is off-hook and a long-distance call is about to be made control CPU 15 will generate a control signal to relay control 15 setting the latch circuit therein. When its latch circuit is set, relay control 25 will energize relay coil 27 and activate secondary tone generator 24, thereby disconnecting phone instrument 11 from incoming phone line one and reconnecting it to local power supply 23 while simultaneously connecting incoming phone line one to holding load 21, a process which may be referred to as "capturing the incoming line". In this configuration phone instrument 11 will receive the secondary dial tone, and the established tie-in line to the long-distance telephone network will be maintained by holding load 21.

Rotary/DTMF decoder 22 will decode each number dialed upon phone instrument 11 and transmit the same to control CPU 15. One commercially available dual "touch-tone" and rotary decoder found satisfactory for use herein is the tone detector and rotary dial pulse counter model M-907 manufactured by Teltone Corporation of Kirkland, Wash. Once the numbers which make up a valid security code have been received by control CPU 15 and validated, control CPU 15 changes the logic level of the control signal to relay control 25 resulting in a de-energization of relay coil 27 and deactivation of secondary tone generator 24. This in turn reconnects phone instrument 11 directly to the long-distance telephone network, permitting the caller to complete the desired toll call. Of course, rotary/DTMF decoder provides data indicative of the exact telephone number called for further storage and processing as indicated hereinbelow.

In the event a valid security code is never received by control CPU 15, the control signal to relay control 25 is maintained so as to prevent the caller's use of the long-distance telephone network. Only when such a call is terminated and the status of phone instrument 11 returns to on-hook does control CPU 15 change the logic level of the control signal to relay control 25 to de-energize relay coil 27 and de-activate secondary tone generator 24.

As best illustrated in FIG. 2, each of the desired plurality of phone line interfaces 12 may be directly connected to a single phone instrument 11 or indirectly connected to a plurality of phone instruments through any conventional local switching network. So that all phone line interfaces 12 may communicate with control CPU 15 each phone line interface 12A–D is connected to a common bi-directional data bus and a common uni-directional control bus, the opposite end of both buses being received by a conventional port expander 30. Port expander 30 communicates with a single port of control CPU 15 and serves to enable communications with a plurality of separate devices. Where the control CPU 15 is selected to be one manufactured by Intel Corporation of Santa Clara, Calif., a suitable port expander 30 is commercially available from the same manufacturer having the model designation 8243.

In order that control CPU 15 may individually communicate with each phone line interface 12A–D, an output from port expander 30 is also received by a board select decoder/driver 31 such as is available off-the-shelf from Motorola Semiconductor Products, Incorporated of Phoenix, Ariz. having model designation 74C154. Board select decoder/driver 31 receives a binary-coded-decimal (also called BCD) signal indicative of the particular phone line interface with which control CPU 15 desires to communicate and provides an analog enabling signal thereto.

As will be more fully explained below, device 10 may operate with different types of local telephone networks and in several differing modes. So that the user may select which network and mode device 10 is to be utilized, a plurality of mode select switches 32 are provided. Mode select switches 32 may include a single-pole, three-position selector switch 33 and four, single-pole, single-throw switches 34–37, most conveniently enclosed in a minature dual-in-line package. The selected modes are ascertained by the receipt of a power signal from board select decoder/driver 31 and transmission of a response to control CPU 15 via the common bi-directional data bus received by port expander 30.

Control CPU 15 may be selected from any suitable microprocessor available on the market, although Model 8035 manufactured by Intel Corporation noted above has been found acceptable. A master oscillator 40 furnishes timing signals in accordance with manufacturers' specifications for operation of both control CPU 15 and digital clock and calendar 13, the latter of which is convenient to implement utilizing the single integrated circuit model MM 53105 as made by National Semiconductor Corporation of Santa Clara, Calif. Two single-pole, single-throw switches (not shown) are included in a time/date set control 41 for quickly advancing digital clock and calendar 13 to the correct time and date. A four digit display 42 is provided to receive clock and calendar signals via control CPU 15 and display the same.

As is well-known in the art, a read-only-memory (hereinafter referred to as "ROM") 43 of suitable bit capacity and dimensions is loaded with the instructional program for control CPU 15. ROM 43 communicates with control CPU 15 through a conventional demultiplexer/latch 44, which may be an Intel Corporation Model 3212, where, as here, an eight-bit system is found acceptable. Bi-directional buses are connected between control CPU 15 and demultiplexer/latch 44, and ROM 43 and demultiplexer/latch 44, both buses of which receive the output signals from digital clock and calender 13.

Memory 14 includes three separate memories 50, 51, and 52, an address decoding circuit 53, an uninterruptable power supply 54, and a permanent, large capacity memory such as data recorder 55. Memory 50 stores authorized access codes. Memories 51 and 52 store data regarding toll calls made and use of incoming phone lines as denoted hereinafter. All three memories 50, 51 and 52 receive power from an uninterruptable power supply 54 such as rechargable nickel-cadmium batteries. Control CPU 15 stores and retrieves data from memories 50, 51 and 52 by use of address decoding circuit 53, which decodes the desired memory location received from control CPU 15, and another bi-directional bus which ties the data terminals of memories 50, 51 and 52 to the bus running between ROM 43 and demultiplexer/latch 44.

Data recorder 55 directly receives call data from control CPU 15. It should be appreciated that any device capable of large capacity memory (such as a floppy disk) may be utilized as a data recorder 55. However, in view of the relatively slow speed (in digital terms) with which calls are made, it is believed to be most economical to utilize a conventional data cassette recorder for data recorder 55. Moreover, a cassette may be readily handled by laymen without damage to information stored thereon.

Device 10 is adoptable for use with several different system configurations, all as selected by switches 34–37. Switch 34 controls the transfer of data from memories 51 and 52 to data recorder 55 upon an initial or re-application of system power. In order to insure memories 51 and 52 are completely emptied when first starting device 10, control CPU 15 will transfer all data therein to data recorder 55 if switch 34 is in position (say, open) to provide a signal for predesignated logic level when queried through board select decoder/-driver 31. Since control CPU 15 regularly transfers call data during operation, it is unnecessary to perform such a transfer upon re-establishment of system power after an unintentional interrupt. Thus, before initial system power energization, switch 34 is left open, but is immediately closed thereafter.

In the event device 10 is to operate in conjunction with a private branch exchange (known as a "PBX") phone system, it is necessary for control CPU 15 to ignore the first number dialed upon phone instrument 11. In PBX systems a single digit, usually a nine, must first be dialed to obtain a tie-in line to the local telephone utility's phone network. Placing, prior to start-up, switch 35 in a position (say, open) that will provide a signal of predesignated logic level when queried by control CPU 15 through board select decoder/driver 31, control CPU 15 will ignore a first dialed digit of nine before performing any other operations.

Where device 10 is to perform the security function of restricting access to the toll call network to only those callers possessing authorization, most commonly encountered in a business environment, control CPU 15 will require that an access code dialed by the caller match an authorized code stored in memory 50. On the other hand, professional offices such as those of attorneys are not concerned so much with restricting access to the toll call network as they are with providing an easily obtainable accounting by client of all toll calls made on behalf of their different clients. Switch 36 controls which of these two types of operation device 10 is to perform. When switch 36 is in one position, say open, control CPU 15 will accept and record any authorization code of the requisite number of digits or special abbreviated codes such as the symbol "*" found on twelve-position pushbutton phone instrument keyboards. Thus, by arbitrarily assigning and consistently using the same access code for all toll calls attributable to a given client, device 10 can rapidly and economically provide the above noted accounting. When switch 36 is in the opposite position, control CPU 15 will require an exact match between the authorization code entered by the caller and one of the codes stored in memory 50 prior to reconnecting phone instrument 11 with the long-distance telephone network.

In smaller offices it may not be necessary to furnish as many authorization codes as is desirable for use in a larger office. Switch 37 may be utilized to select between two digit and three digit authorization codes, giving the user a choice of up to 100 to 1000 possible authorization codes. Of course, as would be evident to one of ordinary skill in the art, the bit capacity of device 10 can easily be expanded to allow for authorization codes having an even greater number of digits.

Three-position switch 33 selects the operational mode of device 10 from three possibilities: monitor (the normal mode of operation), clock and calendar set and tape change, the latter two modes being for set-up purposes. As would be clear to the ordinarily skilled artisan, control CPU 15 is directed upon the initial application of power to device 10 to set all circuits, memories and internal counters to their respective initialized states, generally off or disabled. Prior to first entering a monitoring mode of operation, and upon each instance of data recorder 55 filling to capacity, switch 33 is turned to the tape change position. Control CPU 15 generates output signals to relay control 25 in each phone line interface 12 disconnecting phone instrument 11 from the incoming phone lines as explained hereinabove to insure that no toll calls are missed. To guarantee that the user checks the accuracy of digital clock and calendar 13, digital clock and calender 13 is reset to display a time of zero. All data presently stored in memories 51 and 52 is dumped into data recorder 55 whereupon device 10 ceases operation until a new tape has been inserted into data recorder 55.

Having inserted a new cassette into data recorder 55, the user must next turn switch 33 to the position marked clock and calendar set. Control CPU 15 generates output signals to relay control 25 in each phone line interface 12 disconnecting all phone instruments from the incoming phone lines where calls are not already established. With digital clock and calendar 13 reset to display a time of zero on time/date display 42, the user may quickly set both the present time and date into digital clock and calendar by selectively closing the switches (not shown) in time/date set control. Where desired, day and month incrementation may be implemented using conventional table look-up techniques.

Having performed the requisite "start-up" procedures, switch 33 may be placed in its "monitor" position, whereupon device 10 advances the cassette tape in data recorder 55 past its leader, and begins to monitor all phone lines and instruments for an attempt to place a call upon the long-distance telephone network. The details of this are as follows. Control CPU 15 generates a control signal through port expander 30 and board select decoder/driver 31 which sequentially samples rotary/DTMF decoder 22 for each phone line interface circuit 12A-D. If the status of any phone instrument 11 is off-hook, control CPU 15 examines whether there is presently a number being dialed and, if so, whether that number if zero or one, either of which is indicative of a forthcoming call upon the long-distance telephone network. If no number is being dialed, control CPU 15 proceeds to examine the next phone interface circuit 12. If a number is being dialed but it is not a zero or one, a counter which counts the number of local calls placed upon that incoming line is incremented and control CPU 15 proceeds to examine the next phone interface circuit 12. Of course, if switch 35 is in a position that would indicate device 10 is being utilized in conjunction with a PBX system and a number nine is dialed, it is ignored and control CPU 15 waits to examine the next dialed number. If a number zero or one is detected, control CPU 15 directs memory 51 to store the line number (e.g., in the example herein one to four), and the time and date of the start of the call. Switch 37 is next interrogated to ascertain whether the access code is to have two or three digits and an output signal provided by control CPU 15 to relay 25 in the phone interface 12 of interest causing its incoming line to be "captured" as defined hereinbefore.

Upon the receipt by control CPU 15 of the next dialed number, switch 36 is interrogated to ascertain whether or not a match with an access code in memory 50 is required. If not, the first number is examined to learn if it is a "*", in which event the access code is recognized as valid. If a match is not required but the first number is not a "*", a counter is incremented and the next digit awaited. When the preselected number of digits has been received, the access code is recognized as valid. If a match with an access code in memory 50 is required, control CPU 15 selectively addresses access code memory 50 as the called digits are received, determining if the dialed access code is authorized. If the dialed code is not an authorized code, that incoming line remains "captured" until phone instrument 11 is returned to an on-hook condition. In this manner an unauthorized caller will always be prevented from completing a long-distance telephone call.

Once the access code has been found to be valid, control CPU 15 provides an output signal to relay 25 directing the reconnection of phone instrument 11 to the incoming line, whereupon the caller may commence dialing the desired toll call number. As dialing is in progress control CPU 15 retains in internal buffers the dialed access code and telephone number along with the line number on which the call was placed and the date and time of the start of the call.

Once dialing is complete and the call in progress, control CPU 15 advances to interrogate the status of the next phone interface circuit 12, repeating the procedure outlined above. If a permitted toll call is made on this next phone interface circuit 12, its data is also temporarily stored in internal buffers within control CPU 15. Data stored in the internal buffers is transferred to memory 51 only after the call corresponding to the data in a particular internal buffer has terminated. If, when control CPU 15 goes to store data in its internal buffers, all such buffers are filled, control CPU 15 "captures" all remaining incoming phone lines and prevents further calls from being established until at least one of the calls in progress is terminated and its data transferred out of an internal buffer.

Control CPU 15 continually sequentially advances through interrogating the status of the various phone interface circuits 12. Eventually control CPU 15 will return to the particular phone interface circuit through which a toll call has been terminated. At this juncture, control CPU 15 obtains the time of call termination and transfers this and all other call data to memory 51. The total number of calls for which data may be stored in memory 51 may be predetermined from its size and the amount of data to be stored for toll call. In the present instance, the selected memories 51 and 52 can each store data for up to eight toll calls. A counter may be incremented each time data is transferred to memory 51. When the data for eight toll calls has been stored therein, control CPU 15 activates data recorder 55 and transfers that data with a preselected format through demultiplexer/latch 44 and control CPU 15 onto the data cassette within data recorder 55. So that monitoring may continue uninterrupted, control CPU 15 immediately begins storing toll call data in memory 52 until it reaches its capacity while toll call data in memory 51 is being emptied. In this fashion one memory is always available to receive toll call data.

It should be appreciated that device 10 is constructed in such manner as to prevent the loss of any stored toll call data. It is plainly evident that toll call data already transferred onto a data cassette is maintained indefinitely without power. Continuous power supply 54 insures that power to volatile memories 51 and 52 is similarily maintained.

It should also be realized that the toll call data stored upon one or more data cassettes may be easily correlated to cost information provided on the billing statement from the local utility, which statement universally provides a cost for each toll call placed on a given line, the telephone number that was called and the date and time of the call. For example, the data cassettes could be quickly read into a microprocessor based system into which the utility billing data could also be rapidly inserted through keyboard entry. The system could sort and match toll call numbers, dates and times and furnish a printout of costs attributable to each separate client represented by designated authorization codes.

It is well to note that memory 50 also should be selected with consideration given to the ease with which authorization codes may be added, deleted or modified. If changes are to be made in the field, it may be best to employ a random access memory (also known as "RAM"). On the other hand, where authorization codes are to be fixed during manufacture, a fusible-link ROM memory may be preferable.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of controlling access to the long-distance telephone network and logging selected data pertaining to allowed calls.

I claim:

1. A device to control access to and log telephone calls made upon a long-distance telephone network, comprising:
   a telephone instrument;
   telephone line interface means for selectively connecting said telephone instrument to an incoming telephone line and a local telephone power supply system, said telephone line interface means providing output signals indicative of the operational status of said telephone instrument and all numbers dialed on said telephone instrument;
   clock and calendar means for continuously providing output signals indicative of the present date and time-of-day;
   access code memory means for storing and providing output signals indicative of a plurality of security codes authorized for utilization of the long-distance telephone network;
   first and second log memory means for temporarily storing data regarding all outgoing long-distance telephone calls made from said telephone instrument;
   control means for receiving said output signals from said telephone line interface means, said clock and calendar means and said access code memory means, said control means monitoring said telephone line interface means and upon detection of a dialed digit initiating a tie-in to the long-distance telephone network directing the connection of said telephone instrument to said local telephone power supply system and connection of said incoming telephone line to a holding load, said control means comparing the next preselected plurality of dialed digits received to those stored in said access code memory means to determine the validity thereof, said control means upon determination of a valid access code directing said telephone line interface means to reconnect said telephone instrument with said incoming telephone line and further directing one of said memory means to record said dialed access code and telephone number, the date of said call and the time of call initiation and termination; and,
   data recorder means for periodically receiving data stored in said first and said second log memory means, said control means routing data from whichever of said log memory means is substantially filled with data to said data recorder means while employing the other said log memory means to record data for toll calls made during the time of data transfer.

2. A device, as set forth in claim 1, wherein said telephone line interface means includes relay means for selectively connecting said telephone instrument to an incoming telephone line and a local telephone power supply system, decoder means receiving all numbers dialed upon said telephone instrument and providing output signals indicative of the operational status of said telephone instrument and all numbers dialed thereon; and, relay control means receiving control signals from said control means and selectively furnishing operational power to said relay means.

3. A device, as set forth in claim 2, wherein said telephone line interface means further includes secondary tone generator means for generating a local dial tone for said phone instrument whenever said phone instrument is disconnected from said incoming telephone line, said secondary tone generator receiving an activation logic signal from said relay control means and providing its local dial tone across the output terminals of said local telephone power supply system.

4. A device, as set forth in claim 3, wherein said telephone line interface means further includes line reversal protection means receiving said incoming phone line for preventing damage to the device as a result of reversal of the polarity of said incoming phone line.

5. A device, as set forth in claim 1, wherein said first and second log memory means includes continuous power supply means for furnishing said first and second log memory means with a source of uninterruptable power whereby no data is lost in the event of a system power interruption.

6. A device, as set forth in claim 5, further including a plurality of incoming lines and a like plurality of said phone line interface means, said device further including means for receiving output signals from said control means and enabling the selective interrogation of said plurality of said phone line interface means.

7. A device, as set forth in claim 6, further including a plurality of mode select switch means for selecting a mode of operation and system configuration, said plurality of mode select switch means periodically scanned by said control means to ascertain the position of each of said plurality of mode select switch means.

8. A method to control access to and log telephone calls made upon a long-distance telephone network comprising the steps of:
monitoring the operational status of and all numbers dialed on a telephone instrument;
detecting a dialed digit initiating a tie-in to the long-distance telephone network;
connecting the telephone instrument to a local telephone power supply system and the incoming telephone line to a holding load;
comparing the next preselected plurality of dialed digits received to preselected acess code numbers to determine the validity thereof; and,
upon determination of a valid access code reconnecting the telephone instrument with the incoming telephone line and recording the dialed access code and telephone number,
said step of recording the dialed access code and telephone number including the steps of recording in a first memory until its capacity is substantially reached, thereafter recording in a second memory until its capacity is substantially reached, and transferring the data stored in said first memory to a large-capacity third memory during such time as said second memory is in use.

9. A method, as set forth in claim 8, wherein said step of comparing the next preselected plurality of dialed digits received to preselected access code numbers includes the step of searching an access code memory storing said preselected access code numbers for an identical access code number.

10. A method, as set forth in claim 8, further including the steps of changing said third memory upon its substantially filling to capacity, said step of changing said third memory including the steps of connecting the telephone instrument to a local telephone power supply system and the incoming telephone line to a holding load, transferring all remaining data in said first and said second memory to said third memory, and replacing said substantially filled third memory with an unfilled third memory.

11. A method, as set forth in claim 10, further including the steps of setting a clock and calendar and recording the date and time of initiation and termination of each telephone call made upon the long-distance telephone network.

12. A method, as set forth in claim 11, wherein said step of monitoring the operational status of and all numbers dialed on a telephone instrument includes the step of sequentially interrogating a plurality of telephone instruments for dialed numbers initiating a tie-in to the long-distance telephone network.

* * * * *

UNITED STATES PATENT AND TRADEMARK OFFICE
CERTIFICATE OF CORRECTION

PATENT NO. : 4,332,982
DATED : June 1, 1982
INVENTOR(S) : Ralph H. Thomas

It is certified that error appears in the above-identified patent and that said Letters Patent are hereby corrected as shown below:

Column 4, line 28, the numeral "15" should read --25--.

Column 6, line 35, the word "for" should read --of--.

Column 7, line 17, the word "to" should read --or--; line 39, the word "calender" (second occurrence) should read --calendar--.

Column 8, line 2, the word "if" should read --is--.

Claim 8, Column 11, line 35, the word "acess" should read --access--.

Signed and Sealed this

Seventh Day of December 1982

[SEAL]

Attest:

GERALD J. MOSSINGHOFF

*Attesting Officer*  *Commissioner of Patents and Trademarks*